INVENTORS
JAMES R. BENNETT
WILLIAM W. PARKER
EUGENE SCHACHNER
BY
Christie, Parker & Hale
ATTORNEYS.

INVENTORS.
JAMES R. BENNETT
WILLIAM W. PARKER
EUGENE SCHACHNER
BY Christie, Parker & Hale
ATTORNEYS.

April 8, 1969 J. R. BENNETT ET AL 3,437,998

FILE CONTROL SYSTEM

Filed Nov. 26, 1965 Sheet 4 of 5

INVENTORS
JAMES R. BENNETT
WILLIAM W. PARKER
EUGENE SCHACHNER

BY Christie, Parker & Hale
ATTORNEYS.

INVENTORS.
JAMES R. BENNETT
WILLIAM W. PARKER
EUGENE SCHACHNER
BY Christie, Parker & Hale
ATTORNEYS.

United States Patent Office 3,437,998

Patented Apr. 8, 1969

3,437,998

FILE CONTROL SYSTEM

James Russell Bennett and William W. Parker, Glendora, and Eugene Schachner, Los Angeles, Calif., assignors to Burroughs Corporation, Detroit, Mich., a corporation of Michigan Filed Nov. 26, 1965, Ser. No. 509,925

Int. Cl. G11b *13/00*

U.S. Cl. 340—172.5 18 Claims

ABSTRACT OF THE DISCLOSURE

A plurality of disk file storage devices arranged into a plurality of groups. A plurality of electronic units is provided, one for each group of storage devices for causing reading and writing in the corresponding group of disk file storage devices. A director means receives and stores requests for access to the storage devices in a random sequence. Each request for access designates an electronics means and a storage means and a storage location in such storage means for accessing. The director means includes apparatus for selecting from all the stored requests for access one which identifies a storage location about to become available for accessing. Apparatus initiates an access through an electronics unit to the storage means designated by the selected request for access.

This invention relates to digital computers and, more particularly, to an improved file control system for disc file systems.

Disc file systems are commonly known, which have a control unit for controlling reading and recording on the discs under control of instructions. Access instructions are sent to the control unit from a data processor which provides the access instructions in an order determined by the data processor. The access instructions specify the address including the track and segment of the track where information is to be read or recorded.

The order in which the data processor sends access instructions to the control unit bears no relationship to the angular position of the disc on which information is to be recorded or read. Consequently, it may take a complete revolution of a disc before the desired segment is in a position to be read or recorded. Such an arrangement is undesirable because much time is wasted for gaining access to the desired segments on the discs. The time wasted in waiting for accesses to discs is very significant when it is considered that the data processor provides a great number of requests for accesses to the control units. Accordingly, the total time delay for accesses over a period of time is large and undesirable.

The concept of accessing discs in accordance with the prior art is to provide an access instruction and then spin the disc until it is in the right position to record or read in the segment specified by the request.

In contrast, the present invention permits a marked reduction in the average access time to a disc file system. In one embodiment of the present invention, a director is provided which allows the aforementioned advantage. The director can be easily added or removed from the system without extensive modification thereto.

In accordance with the present invention, the address of an available memory location coming up on a disc is matched against a list of requests from the data processor and access is given to the request which matches the available address. A preferred embodiment of the invention utilizes an associative memory to store the requests or access instructions and to make the comparisons. This is in contrast to the prior art in which the disc is spun until it is in the right position to allow the desired request to take place.

Briefly, an embodiment of the present invention comprises a plurality of cyclical storage means. Means is included for providing a signal identifying a storage location in each storage means in advance of the availability thereof. A plurality of electronics means is provided each for accessing a different storage means and capable of providing an indication when not busy. A director means is provided for storing a plurality of random requests for access each of which identify an electronics means and a storage location in the corresponding storage means and including means for rapidly selecting any one of the stored requests for access which identifies a storage location about to become available in a storage means coupled to an available electronics means. Means is provided for initiating an access through an electronics means to the storage location designated by the selected request for access.

These and other aspects of the present invention will be more fully understood with reference to the following figures, of which:

*General description*

Figure 1:
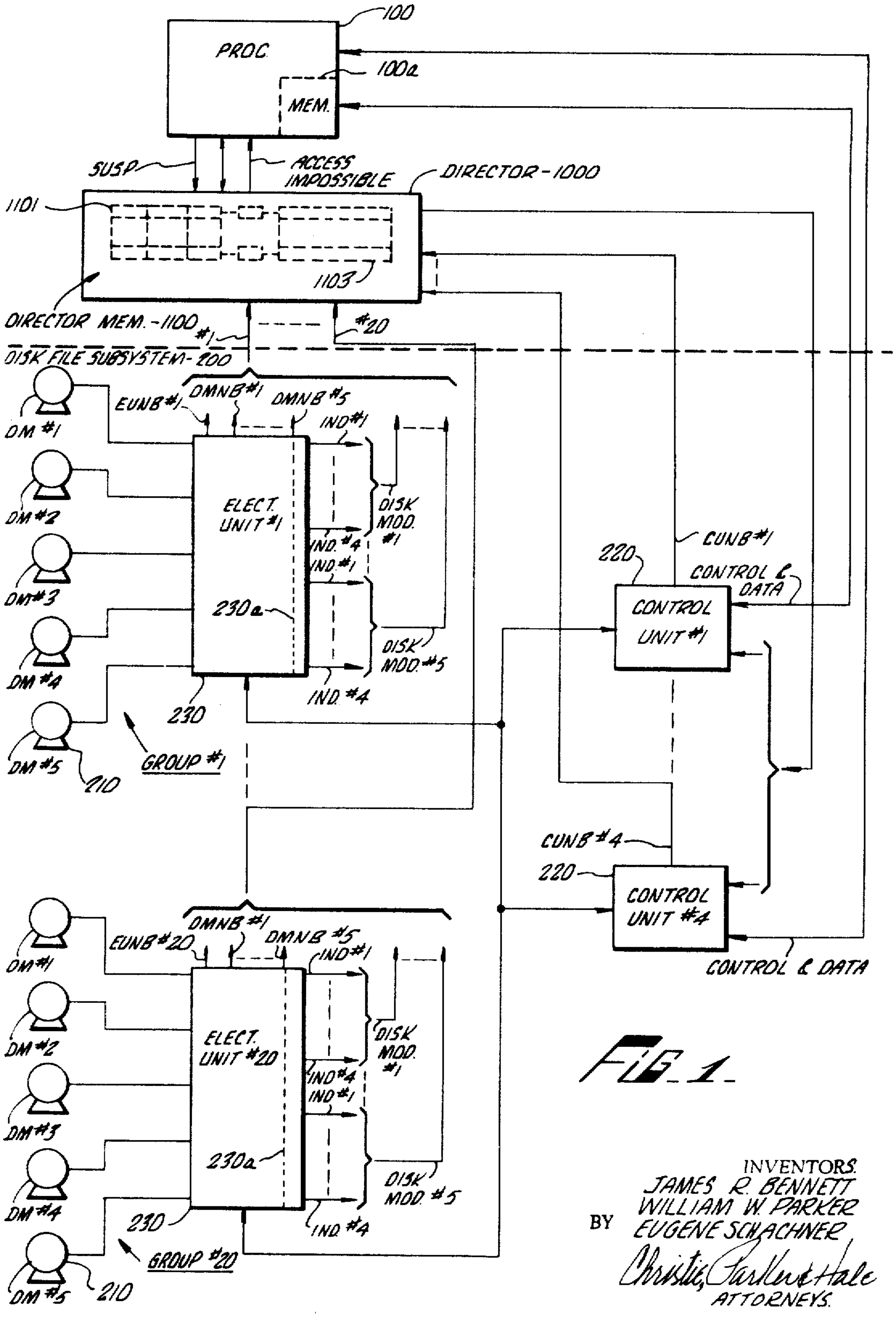
FIG. 1 is a general block diagram of a data processing system and embodying the present invention.

Refer now to the general block diagram of the data processing system shown in FIG. 1. A data processor 100 receives and sends data and access instructions to the peripheral system. A disc file subsystem 200 sends data to and receives data from the processor 100.

The disc file subsystem 200 has twenty groups of five storage modules 210. The five disc storage modules in each group are designated by the symbols DM#1 through DM#5.

Each group of five disc storage modules is connected to an electronic unit 230. There are twenty electronic units, one for each of the twenty groups of storage modules 210. The twenty electronic units are designated by the symbols ELECT. UNIT #1 through ELECT. UNIT #20.

Four control units 220 are provided in the system. The control units control the recording and reading in the disc storage modules 210. Each control unit 220 is capable of being operatively connected to any one of the twenty electronic units. Only one control unit is selectively connected to one particular electronic unit at a time.

Figure 6:
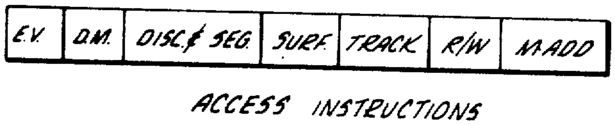
FIG. 6 shows the parts of an access instruction.

The control units 220 operate under control of access instructions sent from the processor 100. The word structure of an access instruction is shown in FIG. 6. As indicated, an access instruction includes a designation of one of the twenty electronic units EU, a designation of one of the five disc storage modules DM which is associated with the designated electronic unit, a designation of a desired disc in the designated storage module and a designation of a desired address segment on such disc DISC & SEG, a designation of the desired surface or side of the disc SURF, and a designation of the desired track TRACK in the designated segment of the designated disc surface. The access instructions also designate whether the control unit is to read or write on a disc surface R/W and designate the address in the memory 100*a* of the data processor 100 wherein data is to either be read out for storage in a disc module or written from a disc storage module.

A control unit stores an access instruction from the data processor. The access instruction is stored in a register of the control unit which is not shown in the drawings. The control unit then operatively connects itself to the electronic unit specified in the access instruction EU.

Assume a write on disc is to take place. If the access instruction specifies that a write operation is to take place, the control unit obtains a data word composed of nine characters from the memory 100*a*. The address of the memory 100*a* from which the word is obtained is specified by the access instruction stored in the control unit. The word from memory 100*a* is then stored in a register of the control unit which is not shown in the drawings. One of the characters of the stored word is then sent from the control unit to the operatively connected electronic unit.

The operatively connected electronic unit 230 is arranged so that it selects the disc file storage module EU designated by the access instruction stored in the corresponding control unit and further selects and couples the address signals from the designated disc module DM to the corresponding control unit. The control unit sends one character of the stored data word to the corresponding electronic unit. The control unit then compares the address signals with the disc and segment DISC & SEG of the stored access instruction. When the designated segment is detected the control unit sends a write control signal (not shown) to the electronic unit causing it to serially shift out the bits of the character stored in the electronic unit. The electronic unit contains electrical circuits (not shown) which select the proper transducers or read/write head on the designated surface of the disc causing the character to be written in the designated track and segment. The control unit subsequently shifts out the next eight characters of the nine-character word contained therein, one by one, and the electronic unit serially shifts the bits of each character out to the corresponding disc storage module into the appropriate track in the same manner as discussed for the first character.

Consider a read operation from disc. A read operation on a disc is performed similar to a write operation. The control unit obtains the access instruction as already discussed and causes the electronic unit to select the segment addresses from the disc storage module specified by the access instruction contained in the control unit. The electronic unit sends the segment address signals to the control unit, and when correspondence between the segment addresses being read from the disc storage module and the segment address SEG. is detected the control unit causes the electronic unit to read nine characters from the designated disc. The nine characters are read from the segment of the track of the disc of the disc module specified by the access instruction contained in the control unit. Each character is read serially from a disc and accumulated bit-by-bit in the electronic unit. After being stored in the electronic unit each character is sent in parallel to the disc file control unit where it is stored in the same buffer register used for storing a data word during a write operation. After the control unit accumulates nine characters (a complete word), the word is sent to the processor 100 for storage in the memory 100*a*. Along with the word for storage, the control unit sends a result descriptor to the processor 100, which includes the address contained in the access instruction. The address tells the processor 100 where in memory 100*a* to store the word read from the disc.

In summary, the electronic units select the heads and buffer information to and from a disc. The disc file control units condition and check the information and address and control addressing, reading and recording in the disc storage modules.

Figure 5:
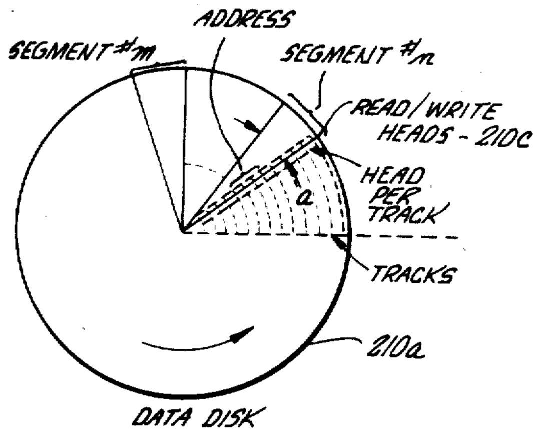
FIG. 5 is a sketch illustrating the layout of information on the discs and the head per track construction of the disc file subsystem of FIG. 1.

Consider the disc storage modules 210. Each storage module has four data discs. A sketch illustrating the layout of a data disc is shown in FIG. 5. The data discs are referenced by the symbol 210A and are each arranged with a plurality of tracks. Each track is divided into segments. A read and write head assembly 210C is provided on each side of each data disc 210A. The read and write head assembly 210C has one transducer or head per track. Thus, it is unnecessary to move a head from one track to another. Each segment of a track is large enough to store one word composed of nine binary coded characters.

Tracks are reserved on one side of each data disc for storing addresses. For purposes of illustration it can be assumed that the address signals are stored on the data disc along a radial line of the disc so that each address is read in parallel. The address signals recorded on a disc designate addresses for both sides of the disc. The address for the segments are displaced back one segment. For example, the address for segment N appears at the beginning of segment $N-1$. The address at the beginning of segment N is the address of segment $N+1$. As a result, the address signals formed by the electronic units for each segment appear at the time that the beginning of the previous segment becomes available for accessing.

The purpose for the displacement between the address on disc and the actual corresponding segment is to allow enough time for a director 1000 to make certain comparisons against the segment address signals from the disc modules and initiate the operation of one of the control units before the segment becomes available for accessing.

Other arrangements for forming the addresses are known in the art. For example, optical devices or counters can be used.

It is assumed that each of the segments from the center of each disk to the outer edge are equal in length. However, different reading and recording frequency zones can be employed with the addition of appropriate gating and registers for each zone.

The segment address is read out from the disc and stored in a register (not shown) in the corresponding electronic unit. A register (not shown) is provided for each disc for each disc storage module for storing addresses. These registers are provided in a position transmitting storage and logic circuit 230*a* in the corresponding electronic unit. The position transmitting storage and logic circuits 230*a* have output cables at which signals corresponding to the position of each of the discs in each of the associated storage modules is provided. The address signals are provided at the output cables in parallel. These output cables are referenced by the symbols IND #1 through IND #4 one set being provided corresponding to each of the disc storage modules 1 through 5.

The IND #1 cable carries signals representing the address of the next segment which will become available for accessing. Thus, during accessing of segment N the address signals for segment $N+1$ are formed. Similarly the IND #2 through IND #4 cables carry signals representing the next available addresses of discs #2 through #4 of the corresponding disc modules.

The processor 100 sends a series of access instructions for recording and reading in the disc storage modules. A director 1000 is provided for receiving and storing the access instructions from the data processor before they are sent to the control units. The director monitors the available storage location addresses as they are formed at the output cables IND of the electronic units. When a disc module approaches the position where a storage location may be accessed which is specified by any one of the access instructions stored in the director 1000, the director 1000 initiates the operation of one of the control units 220.

One of the important mechanisms in the director 1000 for accomplishing the aforegoing operations is an associative memory 1101. The associative memory stores the electronic unit designation EU, the disc storage module designation DM, and the disc and segment designation DISC & SEG of the request for access instructions from the processor 100. The rest of the access instruction is stored in an auxiliary memory 1103 of the director 1000.

The electronic units 230 send the addresses of the next segment which is to become available for accessing to the director 1000 (from IND output cables). The associative memory 1101 compares all of the items stored in the associative memory against the address signals applied on the IND cables and sends the access instruction, if any, which matches to one of the control units causing the control unit to commence processing the access in accordance with the access instruction. Thus the director and its associative memory receive and store access instructions and initiate operations in the control units by sending access instructions to the control units.

*Detailed description of director 1000*

Figure 2:
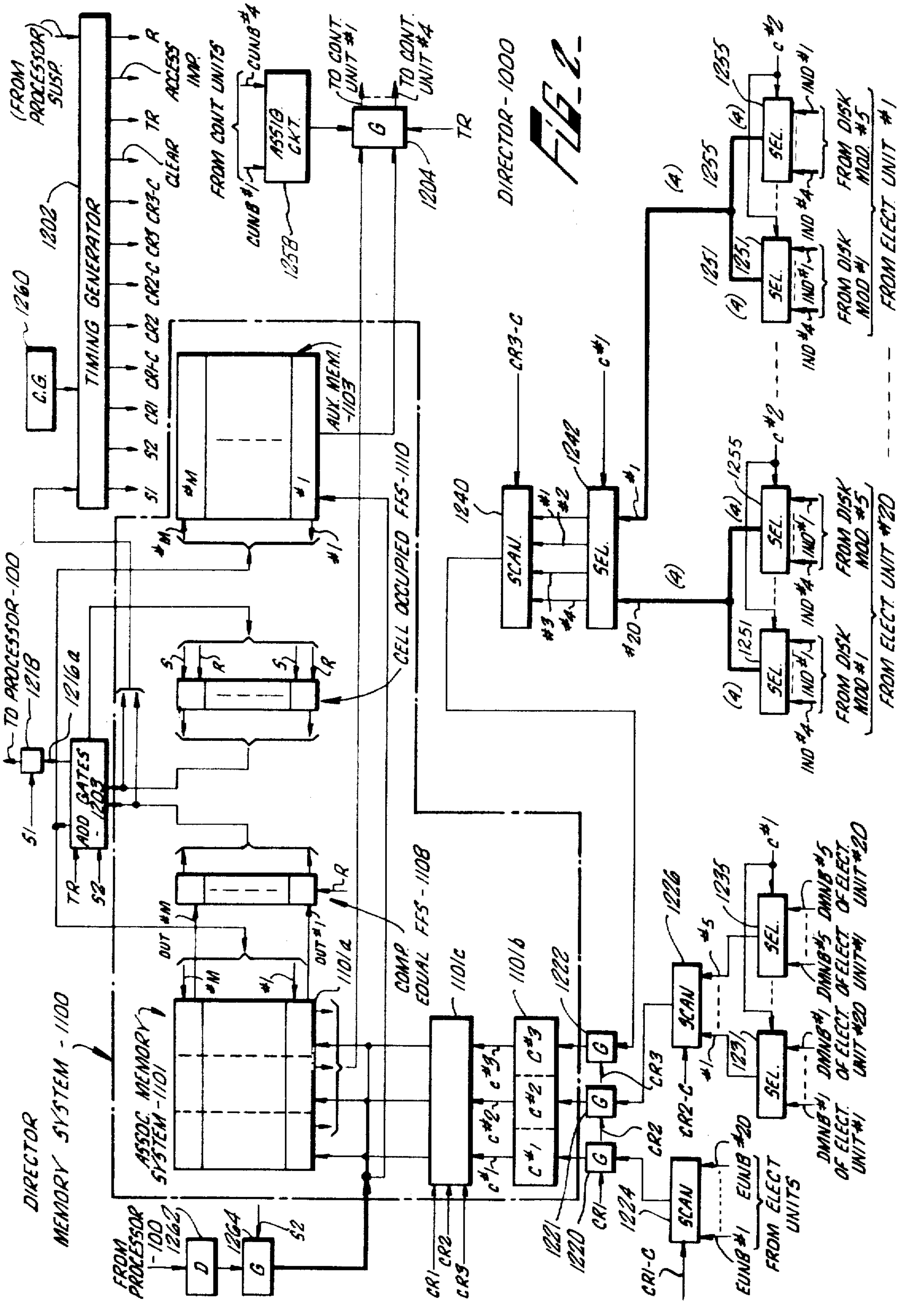
FIG. 2 is a block diagram of the director shown in FIG. 1 and embodying the present invention.

Refer now to the block diagram of the director 1000 shown in FIG. 2. A timing generator 1202 provides timing signals which sequence the operation of the director 1000. The output circuits at which the timing signals are provided are indicated along the bottom of the timing generator 1202.

The director memory system 1100 includes the associative memory system 1101 and an auxiliary memory system 1103. The associative memory system 1101 and the auxiliary memory system 1103 each have one through M storage locations referred to herein as registers.

The associative memory system 1101 includes M associative memory registers 1101*a*. Each register includes the number of solid state storage cells necessary to store the EU, DM, and DISC & SEG portion of an access instruction. Also included in the associative memory 1101 is a compare register 1101*b*. The compare register 1101*b* also has the same number of solid state associative memory cells as are contained in a register of the associative memory. For purposes of explanation, the compare register 1101*b* and the associative reigster 1101*a* are shown divided into three sections C #1, C #2, and C #3, in which are stored the EU, DM, and DISC & SEG portions of an access instruction, respectively.

An associative memory is one whose output is a function of the information stored in each register and the information stored in the compare register 1101*b*. Each solid state cell can store either a binary 0 or a binary 1. Similarly, each solid state cell in the compare register can store either a binary 0 or a binary 1. A gating circuit 1101*c* is connected in between the compare register 1101*b* and the associative registers 1101*a*. The gating circuit 1101*c* is capable of coupling either the C #1, or the C #1 and C #2, or any combination thereof to the associative memory registers 1101*a*.

The associative registers 1101*a* each have an output circuit referenced by the symbol OUT #1 through OUT #M. When the gate 1101*c* couples the entire compare register 1101*b* to the associative registers 1101*a*, the associative register which has the same combination binary bits as the compare register 1101*b*, or in other words matches the content of the compare register 1101*b*, causes a control signal to appear on its output line OUT #1 through OUT #M. When the gate 1101*c* couples only either the C #1 section or the C #1 section and the C #2 section of the compare register to the associative registers 1101A, the gate 1101*c* applies a "don't care" signal to the associative register causing the remainder of the compare register 1101*b* to match regardles of the content of the remainder of the compare register 1101*b*. For example, if only the C #1 section of the compare register 1101*b* is coupled to the associative registers 1101*a* and it matches the content of the corresponding section of one of the registers, a signal will be formed on the corresponding output line OUT regardless of the content of the remainder of the compare register 1101*b*.

It is possible to find the location of any associative memory register which has the same storage content as the compare register 1101*b*, by noting which of the output lines OUT #1 through OUT #M receives a control signal. These and other aspects of the associative memory are known in the computer art. For example, see the article entitled "Associative Techniques With Complementing Flip-Flops" by Edwin S. Lee appearing at pages 381 through 394 of the AFIPS Conference Proceedings, vol. 23, 1963 Spring Joint Computers Conference.

The auxiliary memory 1103 is composed of solid state cells similar to those of the registers 1101*a* arranged into registers #1 through #M as the associative registers 1101*a*. However, the associative characteristics are not used in the auxiliary memory or registers. The auxiliary registers 1103 store that part of an access instruction not stored by the registers 1101*a*.

The address gates 1203 are provided for applying read out signals to the registers 1101*a* and 1103. The address gates have output circuits referenced by the symbols #1 through #M corresponding to the correspondingly numbered registers. A read signal at the output circuit #1 causes register #1 of both the associative registers 1101*a* and the auxiliary registers 1103 to be read out and the signals applied to a gating circuit 1204. The gate 1204 is one which couples the access instruction stored in the director memory system 1100 to the desired control unit.

It is important to note that although the auxiliary memory is described as a part of the director for storing the portion of the access instruction which is not compared, that portion of the access instruction could be stored elsewhere, for example, in the memory of the processor. With such arrangement that portion of the access instruction in the memory would be transferred directly to the control unit when the director so designates.

The director memory system 1100 has a set of compare equal flip-flops 1108 and a set of cell occupied flip-flops 1110. The compare equal flip-flops 1108 provide signals to the address gates 1203 and to the timing generator 1202 indicating which of the registers of the associative registers 1101*a* is detected as being equal to the content of the compare register 1101*b*. The compare equal flip-flops 1108 have one flip-flop for each of the #1 through #M registers 1101*a* and 1103.

Figure 2A:
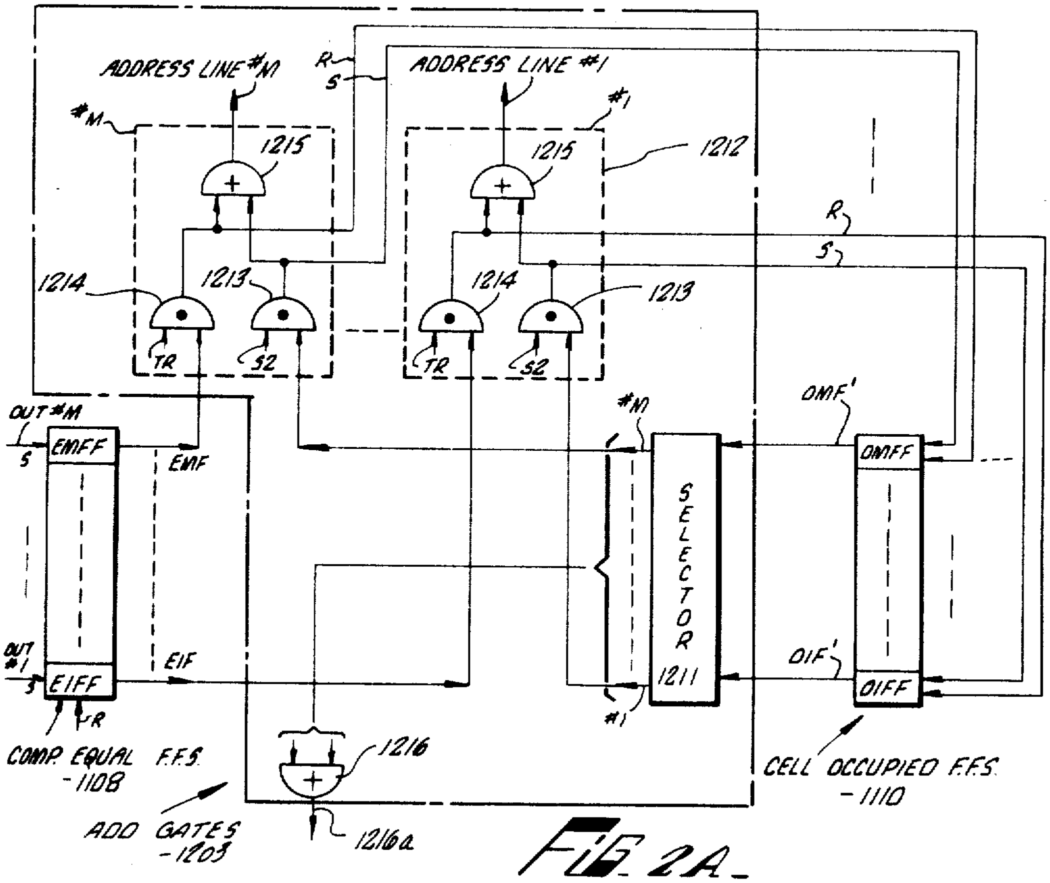
FIG. 2A is a schematic and block diagram showing the compare equal flip flops, the cell occupied flip flops, and the associated gating in the block diagram of FIG. 2 in more detail.

The compare equal flip-flops 1108 are shown enlarged in FIG. 2A and as indicated therein are referenced by the symbols E1FF through EMFF corresponding to the numbers of the associative registers #1 through #M. The compare equal flip-flops 1108 have two sets of controls thereto, the first control is connected to the output lines OUT #1 through OUT #M and the second input is a reset control connected to the R output of the timing generator 1202. A control signal at one of the compare output circuits OUT #1 through #M of the registers 1101*a* causes the corresponding flip-flop of the compare equal flip-flops 1108 to be set into a 1 state. The compare equal flip-flops E1FF through EMFF have output circuits referenced by the symbols E1F through EMF respectively. Each of these output circuits receives a control signal when the corresponding flip-flop is in a 1 state. Each of the compare equal flip-flops 1108 are reset to a 0 state in response to a control signal at the R output of the timing generator 1202.

The cell occupied flip-flops 1110 designate which of the registers 1101*a* and 1103 have received and stored an access instruction from the processor 100. One cell occupied flip-flop is provided for each of the registers #1 through #M. The cell occupied flip-flops are referenced by the symbols O1FF through OMFF and have output circuits referenced by the symbols O1FF through OMFF and have output circuits referenced by the symbols O1F′ through OMF′. The cell occupied flip-flops 1110 receive set and reset signals from the address gates 1203. A control signal on the reset line R to one of the cell occupied flip-flops 1110 causes it to be set into a 0 state whereas a control signal on a set line S to one of the flip-flops causes it to be set into a 1 state. A 1 state of a flip-flop indicates the corresponding register is occupied by an access instruction, whereas a 0 state indicates it is empty and no access instruction is stored there.

Consider now the address gates 1203 shown in FIG. 2A. The address gates 1203 include 1 through M address drivers 1212 referenced by the symbols #1 through #M (only #1 and #M being shown). Address driver #1 applies a control signal on the address line #1 to the registers #1 of both of the registers 1101*a* and 1103. The address driver #M applies a control signal on the address line #M to the registers 1101*a* and 1103 etc.

A selector circuit 1211 is provided in the address gates 1203 for selecting one of the available registers 1101*a* and 1103 into which an access instruction from the processor 100 is to be stored. The available registers are indicated by control signals at the O1F′ through OMF′ outputs when the corresponding cell occupied flip-flops 1110 are in a 0 state. The selector 1211 has a wired-in priority system wherein if there are more than one available registers a control signal is applied on only one of the output circuits thereof. Thus a control signal at the #1 output circuit of selector 1211 indicates that register #1 of 1101*a* and 1103 is available and indicates that the access instruction from the processor is to be stored therein.

Refer now to the details of the address drivers 1212. Each address driver 1212 has two "and" gates 1213 and 1214 connected to the input of an "or" gate 1215. The output of the "or" gate 1215 is connected to the corresponding address line to the registers 1101*a* and 1103. The "and" gates 1213 have input circuits connected to an output circuit S2 of the timing generator 1202 and the corresponding output circuit of the selector 1211. For example, address driver #1 has the "and" gate 1213 connected to the output circuit #1 of the selector 1211 whereas the address driver #M has its "and" gating circuit 1213 connected to the output circuit #M of the selector 1211.

The "and" gates 1214 each have an input circuit connected to the output circuit TR of the timing generator 1202 and to the corresponding one of the output circuits of the compare equal flip-flops 1108. For example, the address driver #1 has its "and" gate 1214 connected to the output circuit E1F and the address driver #M has its "and" gate 1214 connected to the output circuit EMF of the compare equal flip-flops 1108.

With this arrangement an address signal will be formed on the address line #1 in response to a control signal at the S2 output of the timing generator 1202 in coincidence with a control signal at the #1 output of the selector circuit 1211. Similar signals will be formed on the address lines #2 through #M in response to a control signal at the S2 output circuit and control signals at the corresponding outputs of the selector circuit 1211. Also the address driver #1 will form a control signal on the address line #1 in response to a control signal at the TR output of the timing generator 1202 in coincidence with a control signal from the E1F flip-flop of the compare equal flip-flops 1108. Similar control signals are applied on the address lines #2 through #M in response to a control signal from the corresponding flip-flops of the compare equal flip-flops 1108.

An "or" gate 1216 is connected to each of the output circuits of the selector circuit 1211. A control signal at any one of the output circuits of the selector circuit 1211 causes the "or" gate 1216 to form a control signal at the 1216*a* output circuit thereof. With reference to FIG. 2 it will be noted that the output circuit 1216*a* is connected to a gate 1218. The gate 1218 applies a control signal to the processor 100 whenever a control signal is applied at the output circuit 1216*a* in coincidence with a control signal at the S1 output of the timing generator 1202. The control signal from the gate 1218 indicates to the processor that there is an available register in the director memory system 1100 into which an access instruction can be stored.

Refer now to FIG. 2 and consider the selection, scanning and gating circuits shown external to the director memory system 1100. Gates 1220, 1221 and 1222 are provided for storing signals into the C #1, C #2 and C #3 sections respectively of the compare register 1101*b*. The gates 1220, 1221 and 1222 store signals into the corresponding sections of the register 1101*b* in response to control signals at the CR1, CR2 and CR3 outputs of the timing generator 1202.

As already discussed the sections C #1, C #2 and C #3 of the compare register 1101*b* store the designation of the electronic unit EU the disc storage module DM and the disc and segment DISC & SEG of an access instruction, respectively. The gate 1220 stores the designation of an electronic unit that is not busy. The gate 1220 receives its electronic unit designation from a scan circuit 1224. The scan circuit 1224 has its input circuits connected to the output circuits EUNB #1 through EUNB #20 of the electronic units (see FIG. 1). The scan circuit 1224 has a counter and gating circuits (not shown) which allow the output circuits EUNB #1 through EUNB #20 to be scanned. The scanning circuit 1224 scans the output circuits EUNB #1 through EUNB #20 in the order they are numbered. However the scan circuit 1224 is arranged so it only scans the input circuits which are receiving a control signal. For example, if the output circuit EUNB #1 and EUNB #20 are each receiving control signals the scan circuit 1224 scans the input circuits EUNB #1 and then skips to EUNB #20. The counter of the scan circuit 1224 stores a signal corresponding to the one of the input circuits receiving a control signal which is being scanned. For example if the scan circuit 1224 scans the output circuit EUNB #1 a signal corresponding thereto is stored in the counter of scan circuit 1224 causing a corresponding signal to be applied to the gate 1220. If a control signal is not being applied to the EUNB #1 output and the only other output circuit receiving a control signal is EUNB #20, the scan circuit 1224 then stores a signal corresponding to the electronic unit #20 and applies a corresponding signal to the gate 1220. The scan circuit has a control circuit for causing it to scan from one input circuit to the next. This control circuit is connected to the CR1–C output circuit of the timing generator 1202.

Gate 1221 also has an input connected to a scan circuit 1226. The scan circuit 1226 is essentially the same as the scan circuit 1224 except that it scans the input circuits #1 through #5 which are connected to selection circuits 1231 through 1235 rather than the inputs EUNB #1 to EUNB #20. The scan circuit 1226 has its control circuit for causing it to scan from one input to the next connected to the CR2–C output of the timing generator 1202. The selection circuits 1231 through 1235 are connected to the disc storage module not busy lines DMNB from the electronic units (see FIG. 1). The selection circuit 1231 has 20 input circuits which are connected to the output circuits DMNB #1 from each of the electronic units #1 through #20. The selection circuits 1232 (not shown) through 1235 have their input circuits connected to the output circuits DMNB #2 through DMNB #5 of the electronic units #2 through #20.

The selection circuits 1231 through 1235 are gating circuits which couple one of the input circuits thereof to the input of the scan circuit 1226. The input circuit coupled by the selection circuits to the scan circuit 1226 is determined by the content of the C #1 section of the compare rgister **1101*b*. For example, if the C #1 section of the compare register 1101*b* stores a signal designating electronic unit #1 the selection circuits 1231 through 1235 couple the input circuits DMNB #1 through DMNB #5 of electronic unit #1 to the input of the scan circuit 1226. A counter in the scan circuit 1226 scans the disc module not busy lines DMNB which are receiving a control signal causing a control signal corresponding to these lines to be applied to the gate 1221. For example, if the signal designating electronic unit #1 is stored in section C #1 and a control signal is formed at the DMNB #1 output circuit of electronic unit #1, the selection circuit 1231 couples it to the scan circuit causing a corresponding signal to be applied to the scan circuit 1226. The scan circuit in turn scans this input and applies a corresponding signal to the gate 1221 which in turn stores a signal corresponding to disc module #1 into the C #2 section of register 1101*b***.

The scan circuit scans its input signals in response to control signals from the CR2–C output circuit of the timing generator 1202.

The gate 1222 also has its input connected to a scan circuit 1240. The scan circuit 1240 is similar to the scan circuit 1224 except that each of its input circuits is a cable having a number of input lines from the output of a selection circuit 1242. The scan circuit 1240 has four input cables referenced by the symbols #1 through #4 corresponding to the four segment indicator cables from an electronic unit. (See FIG. 1.) The selection circuit 1242 has its input circuits connected to the output circuits of 20 sets of selection circuits. Each set of selection circuits is connected to the indicator cables from one of the electronic units #1 through #20 shown in FIG. 1. For example, five selection circuits are connected to the output circuits of electronic unit #1. These selection circuits are represented by the symbols 1251 through 1255. The selection circuit 1251 has its input circuits connected to the four cables referenced by the symbols IND #1 through IND #4 corresponding to disc storage module #1. Selection circuits 1252 (not shown) through 1255 have similar input circuits from disc storage modules #2 through #5 associated with electronic unit #1. The selection circuits 1251 through 1255 also have a control circuit connected to the *c* #2 output of the C #2 section of the compare register **1101*b***.

A signal in the C #2 section of the compare register **1101*b* designating a particular disc storage module causes the selection circuits 1251 through 1255 to couple the corresponding set of indicator cables to the selection circuit 1242. For example, if the C #2 section stores a signal designating disc module #1, selection circuit 1251 couples the indicator cables IND #1 through IND #4 to the selection circuit 1242. Selection circuits 1252 through 1255** operate in a similar manner in response to signals designating disc modules #2 through #5, respectively.

The selection circuit 1242 couples the indicator cables from one selection circuit to the scan circuit 1240. The particular selection circuit indicator cables coupled to the circuit 1240 is determined by the electronic unit designated by the storage content of the C #1 section of the compare register **1101*b*. For example, if C #1 stores a signal designating electronic unit #1 the set of indicator cables #1 through #4 of selection circuits 1251 through 1255 for electronic unit #1 are coupled to the scan circuit 1240. Thus the selection circuits 1251 through 1255 select the indicator cables for one of the disc storage modules #1 through #5 for all electronics units and couple such cables to the selection circuit 1242. The selection circuit 1242 in turn couples the indicator cables for only the electronic unit designated by the C #1 section of the compare register 1101*b* to the scan circuit 1240. The scan circuit 1240 in turn scans the four indicator cables coupled thereto, one at a time, and couples the cables to the gate 1222. In addition the scan circuit 1240 provides a signal to the gate 1222 identifying the number of the particular storage module indicator cable (which is the same as the number of the corresponding disc) being coupled to gate 1222. The scan circuit scans from one indicator cable to the next in response to control signals at the CR3–C output of the timing generator 1202**.

The gate 1204 couples the access instruction read out of the director memory 1100 to one of the control units. The control unit to which the access instruction is coupled is determined by an assignment circuit 1258. The assignment circuit 1258 has four input circuits coupled to the output circuits CUNB #1 through CUNB #4 of the control units #1 through #4. A control signal at the CUNB #1 output causes the assignment circuit 1258 to in turn cause the gate 1204 to couple the access instruction to control unit #1. A control signal at CUNB #4 output circuit in a similar manner causes an access instruction to be coupled to control unit #4. If a control signal is applied on more than one of the CUNB lines, indicating more than one control unit is not busy, then the assignment circuit 1258 assigns the control units on a priority basis in the order of the numbers assigned the control unit.

The timing generator 1202 has a control gate 1260 connected thereto. The control gate 1260 signals the timing generator 1202 whenever one of the electronic units is not busy and one of the control units connected to such electronic unit is not busy and there is a register in the register memories **1101*a* and 1103** which is occupied and storing an access instruction.

Figure 2B:
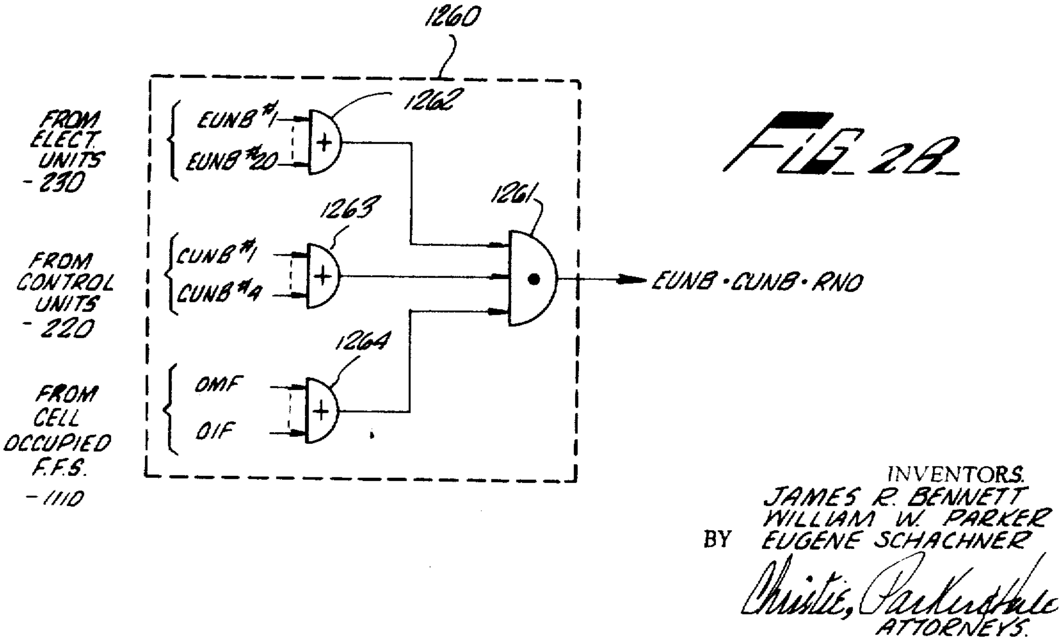
FIG. 2B is a schematic diagram showing the details of the gating circuit 1260 shown in FIG. 2.

FIG. 2B shows the details of the control gate 1260. The control gate 1260 has an "and" gate 1261 having its inputs connected to the outputs of three "or" gating circuits 1262, 1263 and 1264. The "or" gate 1262 has its input circuits connected to the output circuits EUNB #1 through EUNB #20. The "or" gating circuit 1263 has its input circuits connected to the output circuits CUNB #1 through CUNB #4. The "or" gate 1264 has its input circuits connected to the output circuits O1F through OMF. Thus the gate 1260 applies a control signal at its output circuit whenever a control signal is formed at one of the electronic units designating that it is not busy and a control signal is formed by one of the control units designating it is not busy and a control signal is formed at one of the outputs of the cell occupied flip-flops 1110 indicating that at least one of the cells in the register memories. **1101*a* and 1103** is occupied and contains an access instruction.

*Operation of director*

Figure 3:
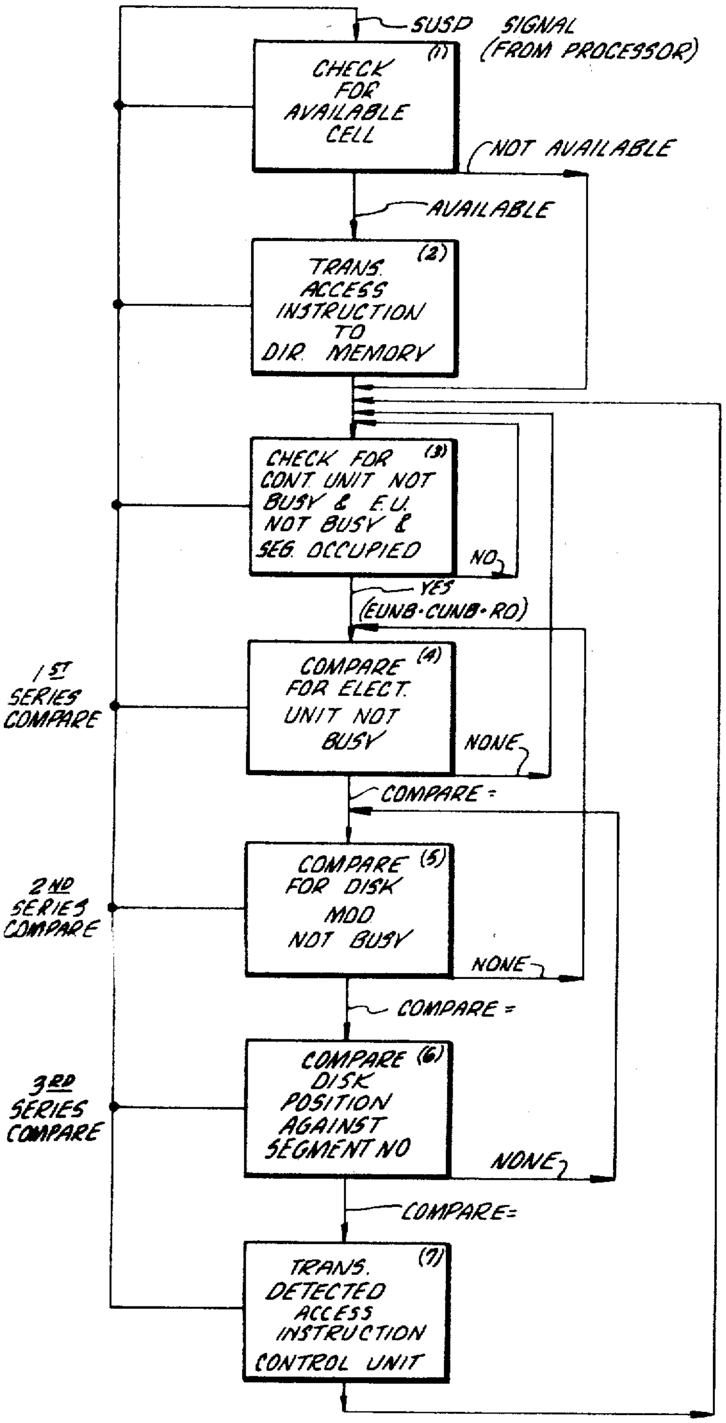
FIG. 3 is a flow chart illustrating the sequence of operation of the data processing system of FIG. 1.

The sequence of operation of the director is illustrated by the flow diagram of FIG. 3. The various states of the director are identified by a number in the right hand corner of each block.

Consider a brief description of the operation. The operation of the system is initiated by a SUSP signal from the processor 100. A SUSP signal from the processor causes the director to go into state 1 and send a signal back to the processor 100 via the gate 1218 indicating if there is an available register in the director memory system 1110 to store an access instruction.

If there is an available register the director goes to state 2 and the processor transfers and the director receives an access instruction. If a register in the director memory system is not available the director skips state 3.

During state 3 the director system checks to see if one of the control units is not busy and if one of the electronic units is not busy and if one of the registers of the director memory is occupied. If the answer is affirmative, the director goes on to state 4. If the answer is in the negative the director remains in state 3.

During state 4 the director compares the not busy electronic units, one by one, with the content of the associative memory registers **1101*a*. If an equality is not detected then none of the stored access instructions designate an electronic unit which is not busy and the director skips back to state 3. If, on the other hand, an equality is detected, then the director goes to state 5**.

State 4 wherein the compare is made to detect a requested electronic unit which is not busy is referred to as a first series compare.

During state 5 a second series compare takes place by comparing the not busy disc modules, one by one, against the access instructions contained in the associative memory registers 1101*a*. If no equality is detected then the director skips back to state 4. If an equality is detected then the director goes on to state 6 wherein a third series compare takes place.

During state 6 the third series compare takes place by comparing the disc positions against the segment designation of the access instructions contained in the associative memory registers 1101*a*. If equality is not detected then the director skips back to state 5. If equality is detected then the director goes on to state 7 wherein the detected access instruction meeting all of the tests is transferred to a not busy control unit.

It should further be noted that during the first series compare the associative memory system compares only the not busy electronic units against the access instructions contained therein until a not busy electronic unit is found which is designated by one or more of the stored access instructions. During the second series compare, the associative memory compares the electronic unit determined during the first series compare together with each one of the designations of the not busy disc modules against the stored access instructions until a not busy electronic unit and corresponding not busy storage module is found which together with the previously determined electronics unit matches an access instruction in the associative memory. During the third series compare the not busy electronic unit and the not busy disc module determined during the first and second series compares together with each one of the corresponding disc indicator signals are compared by the associative memory against the access instructions until a match is found. At this point the access instruction which matches is transferred to one of the not busy control units.

Consider the actual details of operation of the director making reference to FIGS. 1, 2, 2A, 2B and 3.

Assume a control signal is formed at the SUSP output from the processor 100. This causes the timing generator 1202 to be reset to state 1, regardless of its space.

During state 1 the timing generator forms a control signal at the S1 output circuit causing the gate 1218 to send a signal to the processor if there is an available register in the director memory. An available register is indicated by the 0 state of one or more of the cell occupied flip-flops 1110. The 0 state of a cell occupied flip-flop causes the director to go into state 2.

During state 2 the processor 100 sends an access instruction to the director 1100. The access instruction is applied to a decoding circuit 1262 of the director which performs any desired decoding on the access instruction. The decoded access instruction is applied to a gate 1264 of the director. The timing generator 1202 forms a control signal at S2 causing the gate 1264 to couple the access instruction to the director memory. Also during state 2 the address gates 1203 apply an address signal to one of the address lines #1 through #M which is determined by the selector circuit 1211. The control signal at the S2 output causes the access instruction from the gate 1264 to be stored in the one of the registers 1101*a* and 1103 determined by the address control signal from the address gates 1203. At the same time, the gate 1213 which caused the signal on the address line applies a control to the corresponding cell occupied flip-flop, thereby setting it to a 1 state. The director then goes into state 3.

During state 3 a check is made to determine if at least one control unit is not busy and at least one electronic unit is not busy and at least one register in the director memory is occupied. Assume that one of the electronic units is not busy and a control signal is formed at one of the output circuits EUNB #1 through EUNB #20 and one of the control units is not busy causing a control signal at one of the output circuits CUNB #1 through CUNB #4 and one of the rigisters in the director memory contains an access instruction causing a control signal at one of the output circuits O1F through OMF. Under these conditions the control and gating circuit 1260 applies a control signal to the timing generator 1202 causing it to go into state 4. If during state 3 none of the electronic units is not busy, or if none of the control units is not busy, or if none of the registers in the director memory is occupied, then the timing generator 1202 will remain in state 3 until the not busy conditions and register occupied condition is detected.

During state 4 the timing generator 1202 first forms a control signal at the CR1–C output. This signal causes the scan counter 1224 to scan and store a signal identifying an electronic unit which is not busy which is indicated by a control signal at one of the EUNB output circuits. Subsequently the timing generator 1202 forms a signal at the CR1 output causing the gate 1220 to store the signal stored by the scan circuit 1224 into the C #1 section of the compare register 1101*b*. The control signal at the CR1 output also causes the gate 1101*c* to couple the signals from the C #1 section of the compare register to the associative registers 1101*a*. The CR1 signal causes a "don't care" condition to be applied to the sections of the memory registers 1101*a* corresponding to sections C #2 and C #3 of the compare register 1101*b*. Thus the C #2 and C #3 sections of the compare register match the corresponding content of the associative memory regardless of its storage content. If the C #1 sections of the compare register 1101*b* matches the E.U. portion of a stored access instruction, a control signal is formed at the corresponding output OUT #1 through OUT #M and the corresponding cell occupied flip-flop is set to a 1 state.

Assume none of the access instructions match, the associative memory does not apply a control signal at any of its output circuits OUT #1 through OUT #M. This is detected by the timing generator 1202 which then applies a control signal at the CR1–C output circuit. The control signal at the CR1–C output circuit causes the scan counter 1224 to step to the next "not busy" electronic unit which is forming a control signal at its EUNB output circuit. Subsequently, the timing generator 1202 forms another control signal at the CR1 output circuit and the gate 1220 stores signals corresponding to such electronic unit into the C #1 section of the compare register 1101*b*. The CR1 signal again couples the electronic unit designation contained in the C #1 section of the compare register 1101*b* to the associative registers 1101*a* and a comparison again takes place.

Assume now that an equality is detected between the electronic unit designated by the C #1 section of the compare register and one of the access instructions. This will cause a control signal to be formed at the corresponding output circuit OUT #1 through OUT #M. Assume, for purposes of explanation, that a control signal is applied at the OUT #1 output circuit. This control signal will cause the E1FF flip-flop of the compare equal flip-flops 1108 to be set to a 1 state and a control signal to be formed at the E1F output. The timing generator 1202 detects that a match is found (indicated by a control signal at the E1F output circuit) and forms a control signal at the R output. The timing generator 1202 then skips to state 5. The signal at the R output resets all compare equal flip-flops to a 0 state.

If the scan circuit 1224 had scanned through all of the not busy electronic units and the associative memory system had not detected an equality, then the timing generator 1202 skips back to state 3 where the foregoing operation is repeated.

During state 5 the timing generator 1202 first forms a control at the CR2–C output circuit causing the scan counter 1226 to store a signal corresponding to one of the disc storage modules which is not busy and for which there is a control signal at one of the DMNB output circuits. The electronic unit designation contained in the C #1 section of the compare register 1101*b* causes each of the selection circuits 1231 through 1235 to couple the DMNB output circuits from one of the electronic units to the scan circuit 1226. The particular electronic unit is determined by the C #1 section of the compare register 1101*b*. Subsequently the timing generator 1202 forms a control signal at the CR2 output circuit causing the gate 1221 to store the designation of the disc module contained in the scan counter 1226 into the C #2 section of the compare register. The control signal at the CR2 output circuit causes the gate 1101C to couple the C #1 and C #2 sections of the compare register to the associative memory registers 1101*a* and causes don't care signals to be applied in place of the content of the C #3 section. Assuming that the quality is detected between the content of the C #1 and C #2 sections of the compare register and one of the access instructions contained in the instruction register 1101*a*, a corresponding control signal is formed at one of the output circuits OUT #1 through OUT #M, again causing one of the compare equal flip-flops 1108 to be set to a 1 state.

Assuming that a match is not detected during state 5 between the compare register and the access instructions contained in the associative registers 1101*a*, the timing generator 1202 forms another control signal at the CR2–C output followed by a control signal at the CR2 output. This causes the scan counter 1226 to scan to the next DMNB circuit at which a control signal is formed and causes a designation of such disc module to be stored into the C #2 section of the compare register. This operation is repeated until the associative registers 1101*a* detect an equality between a stored access instruction and the contents of the C #1 and C #2 sections of the compare registers.

Assume that the C #1 and C #2 sections of the compare register have been compared and found to be equal to the corresponding parts of one of the access instructions and the corresponding flip-flop or flip-flops in the compare equal flip-flops 1108 are set into a 1 state. The timing generator 1202 detects this condition and forms a control signal at the R output circuit causing the compare equal flip-flop in a 1 state to be reset. The timing generator 1202 then goes to state 6.

During state 6 the timing generator 1202 first forms a control signal at the CR3–C output circuit. At this point the compare register 1101*b* contains a designation of an electronic unit and of an associated disc module which are not busy and which match one or more of the access instructions contained in the associative memory 1101*a*. The signals at the C #2 output of the compare register 1101*b* cause the selection circuits 1251 through 1255 and the selection circuit 1242 to couple the set of indicator cables corresponding to the disk module identified by C #2 to the scan circuit 1240. The control signal at the CR3–C output circuit causes the scan circuit 1240 to store and form an output signal corresponding to the segment address received on one of the cables #1 through #4 coupled to the input circuit thereof. In addition the scan circuit 1240 forms a signal designating a particular disc in the selected disc module which the segment address signal is for.

Subsequently, the timing generator 1202 forms a control signal at the CR3 output causing the disc and segment address signals to be stored in the C #3 section of the compare register 1101*b*. Additionally, the control signal at the CR3 output causes the gate 1101*c* to couple the output signals from the entire compare register 1101*b* to the associative registers 1101*a* and a comparison is made between the content of associative registers 1101*a* and the content of the compare register 1101*b*. If an equality is detected by the associative memory register 1101*b*, a control signal is formed at the corresponding output circuit OUT #1 through OUT #M causing the corresponding compare equal flip-flop to be set to a 1 state.

Assume that the associative memory does not detect an equality between one of the access instructions and the content of the compare register 1101*b*. This means that either the disc number does not match or the segment address is wrong. Therefore the other discs along with their segment addresses (presently being formed) must be checked against the stored access instructions. To this end the timing generator 1202 again forms a control signal at the CR3–C output circuit followed by a control signal at the CR3 output circuit. The control signal at the CR3–C output causes the scan counter 1240 to store and form signals representing segment address signals appearing on the next input cable which is for another disc in the same disc module. The control signal at the CR3 output circuit causes the new disc number signal and segment address formed by the scan circuit 1240 to be stored into the C #3 section of the compare register. This is repeated until the associative registers 1101*a* detect equality between one of the access instructions and the compare register as indicated by one of the compare equal flip-flops being set into a 1 state. If an equality is not detected after the scan circuit 1240 has scanned through each of the four input cables #1 through #4 for the selected disc module, the timing generator will cause the system to skip back to state 5 where the next disc module which is not busy is checked and compared against the stored access instructions. The operation subsequent thereto is similar to that described hereinabove.

Assume that during state 6 a compare equal condition is detected and one of the compare equal flip-flops 1108 is set into a 1 state. The director then goes to state 7.

During state 7 the timing generator 1202 forms a control signal at the TR output circuit. The control signal at the TR output circuit causes the "and" gate 1214 of the address driver circuit 1212 corresponding to the compare equal flip-flop in a 1 state to apply a control signal on its address line. The control signal on the address line causes the content of the corresponding register in both the associative registers 1101*a* and in the auxiliary memory 1103 to be read out and applied to the gate 1204. The assignment circuit 1258 causes the gate 1204 to apply the access instruction to one of the control units which is not busy. Subsequently the timing generator forms a control signal at the R output circuit resetting the compare equal flip-flop, which is in a 1 state, back to a 0 state. The control unit which receives the access instruction is operative for a commencing operation upon receipt of the access instruction causing information to be read or written in accordance with the access instruction.

Figure 4:
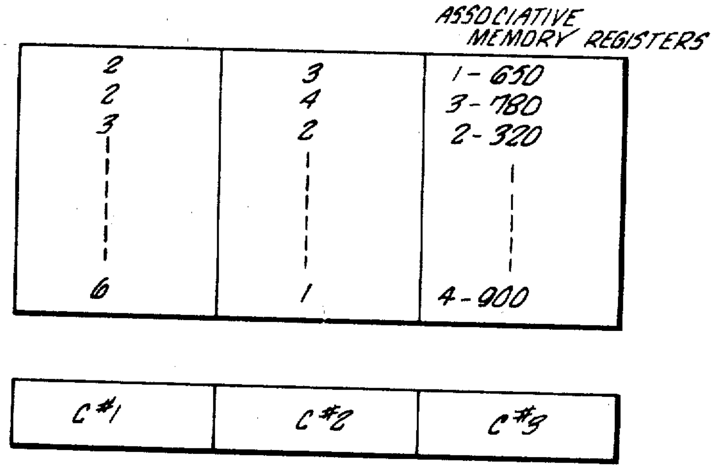
FIG. 4 is a sketch illustrating an example of the content of the associative memory shown in FIGS. 1 and 2.

FIG. 4 shows an example of the storage content of the associative memory registers. The access instruction in the top register shown in FIG. 4 contains the following request: electronic unit #2, disc storage module #3, disc #1 and segment address #650.

It should be noted that comparison of the content of the compare register against all access instructions in the associative registers is done simultaneously. Thus, comparison is done very rapidly. Further, the overall operation of the director is very rapid so that all of the scanning and selection to check all electronic units, all disc storage modules and the discs in a storage module is done in the time it takes to read one disc segment, so that by the time the segment in question is available for accessing a control unit can be conditioned and cause reading and writing in the segment.

The aforegoing is only one example of the invention and is shown by way of example. There are other embodiments of the present invention within the scope of the following claims. For example, it may be desired to provide a priority system to give a higher priority for accessing the disc module to one type of access instruction than another. One such example is an access instruction for the purpose of obtaining information for a tape transport which would be assigned a higher priority than for an access instruction requesting information for a card punch.

Also it may be desired to incorporate one of many possible parity check systems to check for parity errors.

It may also be desired to place part of the director functions in the data processor within the scope of the present invention. Also the system may be modified so that only part of an access instruction is transferred to the control units by appropriate assignment of control for the disc modules to other parts of the data processing system.

What is claimed is:

1. In a data processing system comprising, a plurality of cyclical storage means, control means for accessing selected storage means, means for each storage means for providing signals indicative of a series of storage locations in the corresponding storage means in advance of the availability thereof, means for storing a plurality of requests for access to a plurality of said storage means comprising a designation of a storage means and of a storage location, means for monitoring the stored requests and for initiating an access by the control means when the storage location of the storage means designated by any one of the stored requests is indicated by an indicating means.

2. In a data processing system comprising, a plurality of cyclical storage means, control means for accessing selected storage means, means for each storage means for providing signals indicative of a series of storage locations in the corresponding storage means in advance of the availability thereof, means for storing a plurality of requests for access to a plurality of said storage means comprising a designation of a storage means and of a storage location, means for monitoring the stored requests and for sending a stored request to said control means when a storage location of a storage means designated by such a stored request is indicated by an indicating means causing an access to be initiated by the control means.

3. In a data processing system comprising, a plurality of cyclical storage means, a plurality of control means for selectively accessing any one of the storage means, means for each storage means for providing signals indicative of a series of storage locations in the corresponding storage means in advance of the vailability thereof, means for storing a plurality of requests for access to a plurality of said storage means comprising a designation of a storage means and of a storage location, means for monitoring said stored requests and for sending a stored request to a control means when the storage location of the storage means designated by such stored request is indicated by an indicating means causing an access to be initiated by the control means.

4. In a data processing system the combination comprising, a plurality of cyclical storage means arranged in groups, control means for receiving a control word and for controlling recording and reading in selected storage means, controllable electronics means for each group of storage means for transferring information, under control of said control means, between said control means and the associated storage means, means for providing an indication of an address of a storage location in advance of the time it is available in each cyclical storage means, data processing means for providing a series of control words each comprising an indication of a unique address in a storage means, and director means for storing a plurality of said control words for a plurality of said storage means and comprising means for comparing the address indication with at least said addresses in said stored control words and for detecting a predetermined relation with one of said addresses, said director means being operative upon detection of said predetermined relation for transferring at least a portion of the corresponding control word to said control means causing recording or reading at the corresponding address.

5. In a data processing system the combination comprising, a plurality of rotating surfaces upon which data is read and written in sequentially addressable locations in each of a plurality of tracks, means for recording or reading information in said addresses, data processing means for providing control words, each word designating a rotating surface and an address thereon at which data is to be recorded or read, control means for controlling the selection of a rotating surface and the recording or reading in a location thereon, means for providing an indication of the addresses of the locations on said rotating surfaces in advance of arrival at said recording and reading means, memory means for storing a plurality of said control words for a plurality of said rotating surfaces comprising associative memory means for storing and comparing at least the address portion thereof with the address indications, one by one, and for providing an indication of the storage of a control word having an address corresponding to an address indication, and means for initiating the operation of said control means causing recording or reading in the address of a rotating surface designated by such indicated stored control word.

6. In a data processing system the combination comprising, a plurality of rotating surfaces upon which data is read and written in sequentially addressable locations in each of a plurality of tracks, means for recording or reading information in said addresses, data processing means for providing control words, each word designating a rotating surface and an address thereon at which data is to be recorded or read, control means for controlling the selection of a rotating surface and the recording or reading in a location thereon in accordance with a received control word, means for providing an indication of the addresses of the locations on said rotating surfaces in advance of arrival at said recording and reading means, memory means for storing a plurality of said control words for a plurality of rotating surfaces comprising associative memory means for storing and comparing at least the address portion thereof with the address indications, one by one, and for providing an indication of a stored control word having an address corresponding to an address indication, and means for transferring the indicated stored control word to said control means for recording or reading in the designated address of a rotating surface.

7. In a data processing system the combination comprising, a plurality of rotating surfaces upon which data is read and written in sequentially addressable locations in each of a plurality of tracks, means including a transducing means for each of said tracks for recording or reading information in said addresses, data processing means for providing control words, each word designating a rotating surface and an address thereon at which data is to be recorded or read, control means for controlling the selection of a rotating surface and the recording or reproducing thereon in accordance with a received control word, means for providing an indication of the addresses of the locations on said rotating surfaces in advance of arival at said recording and reading means, memory means for storing a plurality of said control words for a plurality of said rotating surfaces and comprising associative memory means for storing and comparing at least the address portion thereof with the address indications, one by one, and for providing an indication of a stored control word having an address corresponding to such address indication, and means for transferring the indicated stored control word to said control means for recording or reading in the designated address of a rotating surface.

8. In a data processing system the combination comprising, a plurality of cyclical storage means arranged in groups, control means for receiving a control word and for controlling recording and reading in selected storage means, controllable electronics means for each group of storage means for transferring information between said control means and the associated storage means under control of a control means, means for providing an indication of an address of a storage location in advance of the time it is available in each cyclical storage means, data processing means for providing a series of control words comprising a designation of a storage means and of an address therein, and director means for storing a plurality of said control words for a plurality of said storage means, said director comprising compare means for comparing the next address indication with each of said addresses in said stored control words to detect a predetermined relation therebetween and including means utilizing the detected control word for initiating the operation of said control means causing recording or reading in the address of the storage location designated by the detected control word.

9. In a data processing system the combination comprising, a plurality of cyclical storage means arranged in groups, control means for receiving a control word and for controlling recording and reading in a selected one of said storage means, controllable electronics means for each group of storage means for transferring information between said control means and the associated storage means, means for providing an indication of an address of a storage location in advance of the time it is available in each cyclical storage means, data processing means for providing a series of control words comprising an address, and director means for storing a plurality of said control words for a plurality of storage means, said director comprising compare means for comparing the next address indication with the addresses in said stored control words and operative when equality therebetween is detected for causing the director means to transfer the corresponding control word to said control means causing recording or reading in the compared address.

10. In a data processing system the combination comprising, a plurality of cyclical storage means arranged in groups, a plurality of control means for individually receiving a control word and for controlling the recording and reading in said storage means, controllable electronics means for each group of storage means for transferring information between a control means and the associated storage means and including an output circuit for providing a not busy indication, means for providing an indication of an address of a location in each cyclical storage means in advance of the time it is available, data processing means for providing a series of control words comprising a designation of an electronics means and of an associated storage means and of an address of a location therein, director means for storing a plurality of the control words from said processing means and comprising means for comparing each of the stored control words with the electronics means which are indicated not busy and the address indications for the storage means designated by each control word and for transferring to a control means at least a portion of a control word which designates a not busy electronics means having associated therewith a storage means indicated to have a location about to become available corresponding to the address in such control word, said control means controlling the electronics means and causing recording and reading in the address both of which are designated by the received control word.

11. In a data processing system the combination comprising, a plurality of recording surfaces arranged in groups each having a plurality of tracks for information, transducing means for each track for sequentially recording or reading thereon, a plurality of control means for individually receiving a control word and for controlling the recording and reading on said recording surfaces, controllable electronics means for each group of recording surfaces for transferring information between a control means and the transducing means of the associated recording surface and including an output circuit for providing a busy indication, means for each group of recording surfaces for providing an indication of an address of a location on the corresponding recording surfaces in advance of the time it is available, data processing means for providing a series of control words comprising a designation of an electronics means and of an associated recording surface and of an address of a location thereon, director means for storing a plurality of the control words from said processing means and comprising means for comparing each of the stored control words with the electronics means which are indicated not busy and the address indications for the recording surface designated by each control word and for transferring to a control means at least a portion of a control word which designates a not busy electronics means having associated therewith a recording surface indicated to have a location about to become available corresponding to the address in such control word, said control means controlling the electronics means and causing recording and reading in the address both of which are designated by the received control word.

12. In a data processing system the combination comprising, a plurality of recording surfaces arranged in groups each having a plurality of tracks for information, transducing means for each of said tracks for sequentially recording or reading thereon, a plurality of control means for individually receiving a control word and for controlling the recording and reading on said recording surfaces, controllable electronics means for each group of recording surfaces for transferring information between any control means and the transducing means of the associated recording means and including an output circuit for providing a busy indication, means for each group of recording surfaces for providing an indication of an address of a location on the corresponding recording surface in advance of the time it is available, data processing means for providing a series of control words comprising a designation of an electronics means and of an associated recording surface and of an address of a location thereon, director means comprising an associative memory means for storing a plurality of the control words from said processing means and for comparing the stored control words with the electronics means which are indicated not busy and the address indications for the designated recording surface and for transferring to one of the control means a control word which designates a not busy electronics means having associated therewith a recording surface indicated to have a location about to become available corresponding to the address in such control word, said control means controlling the electronics means and causing recording and reading in the address both of which are designated by the received control word.

13. In a data processing system the combination comprising, a plurality of disk storage modules arranged in groups, a plurality of control means for individually receiving a control word and for controlling the recording and reading in said disk storage modules, controllable electronics means for each group of storage modules for transferring information between any control means and the associated storage module and including an output circuit for providing a busy indication, means for each storage module for providing an address indication of a location in the corresponding storage module in advance of the time it is available, data processing means for providing a series of control words in a random order comprising a designation of an electronics means and of an associated storage module and of an address of a location therein, director means for storing a plurality of the control words from said processing means and comprising means for comparing the stored control words with electronics means which are indicated not busy and for identifying a stored control word designating a not busy electronics means, means for storing a signal corresponding to a not busy electronics means and of the associated storage module designated by a stored control word, selection means for coupling to the compare means the address indications for the storage module associated with the electronics means identified by the signal storing means, said compare means being operative to compare such coupled address signals with the content of said storing means and for causing said director means to transfer to one of the control means a control word which designates a not busy electronics means having associated therewith a storage means indicated to have a location about to become available corresponding to the address in such control word, said control means controlling the electronics means and causing recording and reading in the address both of which are designated by the received control word.

14. In a data processing system comprising
a plurality of cyclical storage means,
means for providing a signal identifying a storage location in each storage means in advance of the availability thereof,
a plurality of electronics means each for accessing a different storage means and capable of providing an indication when not busy.
director means for storing a plurality of random requests for access each of which identify an electronics means and a storage location in the corresponding storage means and including means for rapidly selecting any one of the stored requests for access which identifies a storage location about to become available in a storage means coupled to an available electronics means, and
means for initiating an access through an electronics means to the storage location designated by the selected request for access.

15. In a data processing system comprising
a plurality of cyclical storage means,
means for providing a signal identifying a storage location in each storage means in advance of the availability thereof,
a plurality of electronics means each for accessing a different plurality of said storage means and capable of providing an indication when not busy,
director means for storing a plurality of random requests for access each of which identify an electronics means, a storage means and a storage location in the storage means and including means for rapidly selecting any one of the stored requests for access which identifies a storage location about to become available in a storage means coupled to an available electronics means, and
means for initiating an access through an electronics means to the storage location of the storage means designated by the selected request for access.

16. In a data processing system comprising
a plurality of cyclical storage means,
means providing a signal identifying a storage location in each storage means in advance of the availability thereof,
a plurality of controllable electronics means each for accessing a different plurality of said storage means and capable of providing an indiction when not busy,
director means for storing a plurality of random requests for access each of which identifies an electronics means, a storage means and a storage location in the storage means and including means for rapidly selecting a particular not busy electronics means and a particular storage means coupled thereto indicated to have a location which is about to become available which particular electronics means and location are identified by any one of the stored requests for access, and means for initiating an access through the selected electronics means to such storage location which is about to become available.

17. In a data processing system comprising
a plurality of cyclical storage means each including means for providing a signal identifying each storage location therein in advance of the availability thereof,
a plurality of electronics means each coupled to a different plurality of said storage means for selectively reading and writing therein and capable of providing an indication when not busy,
director means for storing a plurality of random requests for access each of which identifies an electronics means, a storage means and a storage location in the storage means, including means for selecting a not busy electronics means and a storage means coupled to such electronics means and the storage location indication signal for such storage means which are identified by a particular stored request for access and means for comparing the selected storage location indication signal which is being formed upon selection with said particular request for access for a predetermined relation therebetween,
said selecting and comparing means being operative for selectively and rapidly repeating the selection and comparing for other stored requests for access within the time a storage location is available for accessing until said predetermined relation is detected, and
means for initiating reading or writing through an electronics means to a storage location which are designated by a request for access found to have said predetermined relation.

18. In a data processing system the combination comprising a plurality of cyclical storage means arranged in groups, a plurality of control means for individually receiving a control word and for controlling the recording and reading in said storage means, controllable electronics means for each group of storage means for reading and writing information in the associated storage means and including an output circuit for providing a not busy indication, means for providing an indication of an address of a location in each cyclical storage means in advance of the time it is available, data processing means for providing a random series of control words comprising a designation of an electronics means and of an associated storage means and of an address of a location therein, director means for storing a plurality of the control words from said processing means and comprising means for transferring to a control means at least a portion of any one of the control words which designates an address about to become available in a storage means coupled to a not busy electronics means also designated by such any one control word, said control means controlling the electronics means and causing recording and reading in the address both of which are designated by the received control word.

References Cited

UNITED STATES PATENTS

| | | | |
|---|---|---|---|
| 3,343,132 | 9/1967 | Hanson et al. | 340—172.5 |
| 3,350,694 | 10/1967 | Kusnick et al. | 340—172.5 |
| 2,843,841 | 7/1958 | King et al. | 340—173 |
| 3,079,594 | 2/1963 | Johnson | 340—174.1 |
| 3,289,174 | 11/1966 | Brown et al. | 340—172.5 |

PAUL J. HENON, *Primary Examiner.*

R. B. ZACHE, *Assistant Examiner.*